United States Patent [19]

Read

[11] 3,980,040
[45] Sept. 14, 1976

[54] DIFFERENTIAL PRESSURE INDICATOR
[75] Inventor: Brian Read, Chester, England
[73] Assignee: Fawcett Engineering Limited, Bromborough, England
[22] Filed: Mar. 27, 1975
[21] Appl. No.: 562,521

[30] Foreign Application Priority Data
Mar. 29, 1974 United Kingdom............ 14056/74

[52] U.S. Cl............................. 116/114 PV; 73/419
[51] Int. Cl.².................... G01D 7/00; G01L 7/16
[58] Field of Search............ 116/114 PV, 114 AD; 73/419, 38, 407 R; 340/60, 239 F

[56] References Cited
UNITED STATES PATENTS 3,125,062  3/1964  Raupp et al. .............. 116/114 PV
3,379,206  4/1968  Whiting ...................... 116/114 PV Primary Examiner—Donald O. Woodiel
Attorney, Agent, or Firm—Woodhams, Blanchard and Flynn

[57] ABSTRACT

A differential pressure indicator for indicating the state of a filter element comprises a magnetic piston slidable in a sleeve against a spring and subjected at its opposed faces to the pressures on each side of the filter element. A rod fixed to the piston has steps or projections which can be forced through an expansible collet as the differential pressure increases. The piston thus has a limited number of precise positions which are indicated by an indicator element of magnetic material slidable on a member exterior of the sleeve.

10 Claims, 4 Drawing Figures

DIFFERENTIAL PRESSURE INDICATOR

Relevant prior art: U.S. Pat. No. 3,375,720

BACKGROUND OF THE INVENTION

The present invention relates to differential pressure indicators which may for example be used to give an indication of the state of a filter element in a filter by indicating the value of the pressure differential across it. An object of the invention is to provide an indicator which at all times give a definite and unambiguous indication in which the need to bring a shaft or like element out through a wall of the indicator through some kind of seal with its attendant friction, is avoided.

According to the present invention there is provided a differential pressure indicator comprising a piston slidable in a cylindrical sleeve the opposite ends of which are in communication with fluid spaces between which a differential pressure may exist, resilient biasing means urging the piston towards the end of the sleeve associated with the higher pressure, a resiliently yieldable stop means for yieldably impeding movement of the piston in the direction against the resilient bias, an indicator member slidable on a surface exteriorly the cylindrical sleeve and having a magnetic interconnection with the piston, a casing having a transparent portion and an opaque portion which conceals at least part of the indicator member in at least part of its range of movement, the arrangement being such that in use, with increasing differential pressure across the differential pressure indicator, the yieldable stop means holds the piston in a first position for as long as the differential pressure does not exceed a predetermined value but when the differential pressure exceeds this value the differential pressure across the piston will move the latter to a second position by causing the stop means to yield, the indicator member following the movement of the piston and co-operating with the casing so as to give a distinctive different visual indication in each of the positions of the piston.

Where required, there may be a plurality of spaced yieldable stops for yieldably impeding movement of the piston in the direction against the resilient bias. Thus, in a particular advantageous application of the invention, the differential pressure indicator may be used to indicate the degree of contamination of a filter element in a filter for filtering fluid, the filter including a bypass valve arranged to open and bypass the filter element when the differential pressure across the filter element reaches a predetermined value. The differential pressure indicator would then have two spaced yieldable stops thus defining three possible positions for the piston and thus for the indicator member. The first position would then indicate that the pressure differential across the filter element is normal and that the degree of contamination of the filter element is sufficiently small to ensure reliable operation. When, however, the degree of contamination increases to an extent such that the filter element, although still operating satisfactorily, needs to be replaced shortly, the pressure differential across the piston will be sufficient to move the piston pass the first stop, thereby moving the indicator member to a position indicating that the filter element should be changed at some convenient time in the near future. If, however, this is neglected, the contamination will gradually increase until the filter element is effectively blocked and the bypass valve accordingly opens. This high value of differential pressure is sufficient to move the piston past the second stop to carry the indicator member to a position indicating that the filter element must be changed immediately to avoid damage to the system. The pressure differential indicator may include means for operating an alarm signal under these conditions.

The transparent portion of the casing may be formed as a lens arranged to ensure that the same portion of the indicator member is seen over a wide range of viewing angles. The differential pressure indicator may be self-resetting, in which case the biasing means will return the piston to its original position whenever the differential pressure drops to a sufficiently low value. If desired, however, the indicator can be constructed so that the piston cannot return to a previous position without the operation of a resetting member which in the case of a filter may be accessible only when the filter element has been removed.

DETAILED DESCRIPTION

Figure 1:
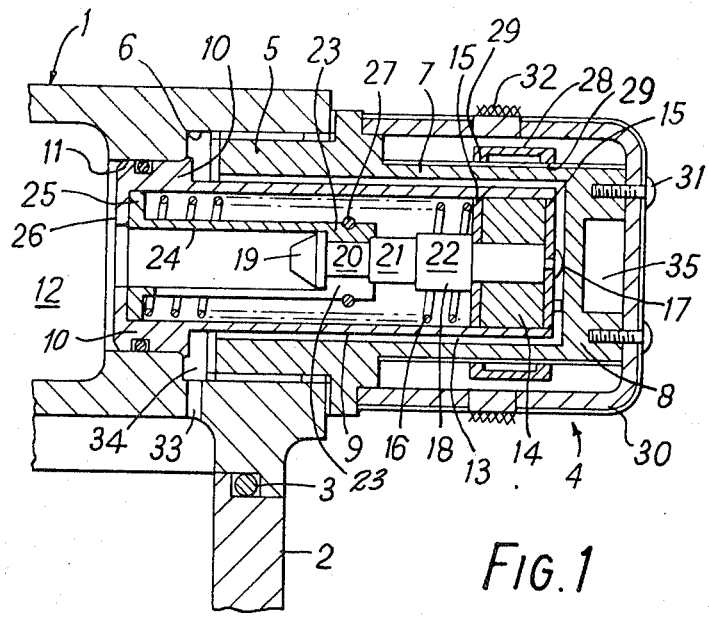
FIG. 1 is an axial sectional view of a differential pressure indicator mounted in a filter for fluids.

Referring to the FIG. 1, there is shown part of a fluid filter comprising a base 1 carrying a filter element (not shown) which may be of the pleated paper type, housed within a bowl 2 secured to the base 1 with a suitable seal 3. An indicator device 4 comprises an externally screw threaded bush 5 engaged in a tapped hole 6 in the base 1, the bush 5 being of non-magnetic material such as brass and having a cylindrical sleeve portion 7 the outer end of which is closed by an end wall 8.

A second sleeve 9 is enlarged at one end 10 where it is secured in an aperture 11 in a wall between the bore 6 and a space 12 communicating with the interior of the filter element. The sleeve 9 is thus supported so as to be coaxial with the sleeve 7, but leaving a small gap 13 between them, the free end of the sleeve 9 being spaced slightly from the end wall 8.

An annular permanent magnet 14 has its outer surface ground to be a close sliding fit in the interior of the second sleeve 9 which, like the sleeve 7 is of non-magnetic material such as brass. A soft iron washer 15 is secured to each face of the magnet 14 and the assembly thus formed is urged to the right (as seen in the figure) by a helical spring 16. The washers 15 are held in contact with the magnetic piston 14 by a screw 17 engaged in the shank of a step rod 18 having an enlarged, chamfered head 19.

The rod 18 has three cylindrical portions 20, 21 and 22 of progressively increasing diameter and extends into the jaws 23 of a split collet 24 having a base flange 25 of which is held in contact with a flange 26 on the thickened sleeve 9 by the inner end of the spring 16. A garter spring 27 holds the jaws of the collet 24 in contact with the rod 18.

An indicator ring 28 of magnetic material such as soft iron is slidable with low friction on the exterior of the first sleeve 7 and can thus follow the movements of the magnetic piston 14, the indicator ring preferably having inturned flanges 29 at the same spacing as the washers 15.

A cover 30 of moulded plastics material is secured to the end wall 8 by screws 31. It surrounds the indicator ring 28 with a clearance and is opaque except for a short axial length equal to half the axial length of the indicator ring 28, so that only half the axial length of the latter is visible through the transparent portion 32 of the cover 30 at any one time.

OPERATION

In operation, fluid to be filtered is supplied to the interior of the bowl 2 and under normal conditions passes inwards through the filter element to the outlet chamber 12 and thence to the outlet of the filter. The inlet pressure within the bowl 2 is applied through a passage 33 and space 34 to the gap 13 between the first and second cylindrical sleeves 7 and 9 and is thus applied to the washer 15 at the right hand, outer end of the piston 14. The outlet pressure in the space 12, is applied to the left hand end of the piston 14. Accordingly, the piston is subjected to a force proportional to the differential pressure between the inlet and outlet to the filter.

In the position shown in the drawing, the jaws 23 of the collet 24 are engaged with the smallest portion 20 of the stepped rod 18. The garter spring 27 in conjunction with the helical spring 16 prevents movement of the piston 14 to the left until the differential pressure across the piston 14 exceeds a first predetermined value representing an upper limit to the differential pressure which is acceptable in normal use. The differential pressure then moves the piston 14 to the left, forcing the cylindrical portion 21 between the jaws of the collet 24 until the jaws come into contact with the edge of the largest portion 22. In the original position shown in the drawing the left hand half of the indicator ring 28 is exposed to view through the window 32 and may be colored green to indicate that the filter element is in good condition. When the piston 14 moves to the left, it moves the indicator ring to the left until the right hand portion of the indicator ring is visible through the transparent window 32. This right hand portion may be colored orange to indicate that the filter element should be changed at the next convenient opportunity, such as when the installation is shut down for servicing. If however the filter element becomes clogged to the extent that the differential pressure across the filter medium is sufficient to open the bypass valve, this differential pressure forces the piston 14 still further to the left thereby driving the largest portion 22 of the rod 18 between the jaws of the collet 24, thereby further stretching the garter spring 27. This further movement of the piston 14 carries the indicator ring 28 with it to a position where no part of the indicator ring is visible through the window 32. Instead, the outer surface of the outer sleeve 7 is exposed to view. For this purpose this outer surface may be colored red, indicating that the installation should be shut down immediately and the filter element replaced.

If a remote indication is required that this has happened, a magnetically operated switch may be installed in a cavity 35 and may be arranged such that when the piston 14 is in its right hand position adjacent the cavity 35 the switch contacts are closed whereas when the piston 14 moves to the left the switch contacts open, breaking a circuit and operating an alarm.

The collet 24 and rod 19 may be of moulded nylon. The required color for the exterior of the sleeve 7 may be achieved by means of a shrunk-on plastics sleeve. The garter spring 27 in lower pressure applications may be an O-ring.

An externally releasable catch (not shown) may allow free movement of the indicator member 28 to the left (as seen in the Figure) but prevent return movement to the right, for example on shut-down, until an external operating member is operated.

It will be noted that there is no mechanical connection between the external indicator member (which is under atmospheric pressure) and the piston 14 (which is under fluid pressure). This avoids the need for seals and avoids the friction which is inevitable with such seals and which can cause delayed or otherwise inaccurate operation.

MODIFICATIONS

Figure 2:
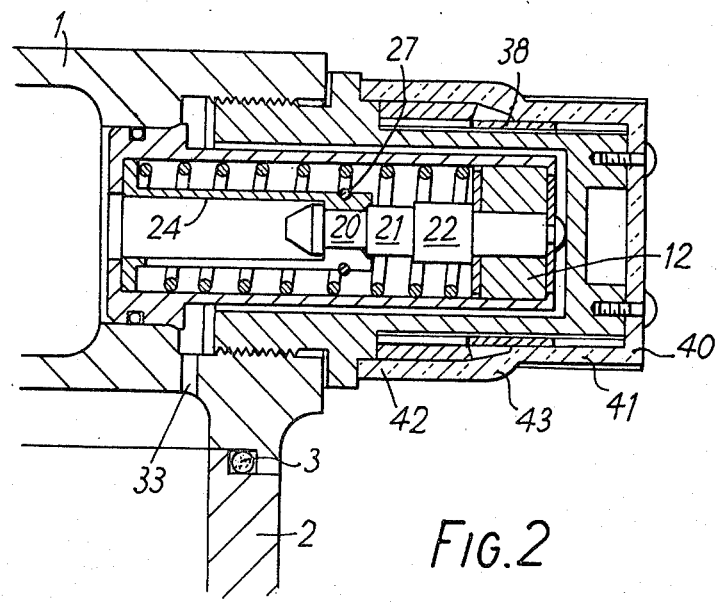
FIG. 2 is a view similar to FIG. 1 but showing a modification.

The embodiment shown in FIG. 2 differs from that shown in FIG. 1 in that the indicator element 28 is replaced by a radially thinner element (still of ferromagnetic material) and casing 30 is replaced by a casing 40 having two cylindrical portions 41 and 42 which are made opaque and are interconnected by a rounded transparent portion 43 which acts as an annular lens in that it displays the same portion on the indicator element 38 over a wide range of viewing angles.

The differential pressure indicators shown in FIGS. 1 and 2 are automatically self-resetting in that the spring 16 also returns the piston to the position shown in the figures in the absence of any sufficient differential pressure to move the piston into one of its other positions. This has the advantage that the indicator automatically restores itself to the correct position after any sudden pressure surge in the system which might temporarily move the piston to an inappropriate position. Moreover, when the hydraulic installation which includes the filter is undergoing a routine service, the installation will be tested in operation whereupon any need for replacement of the filter element will be indicated to the service engineer.

Figure 3:
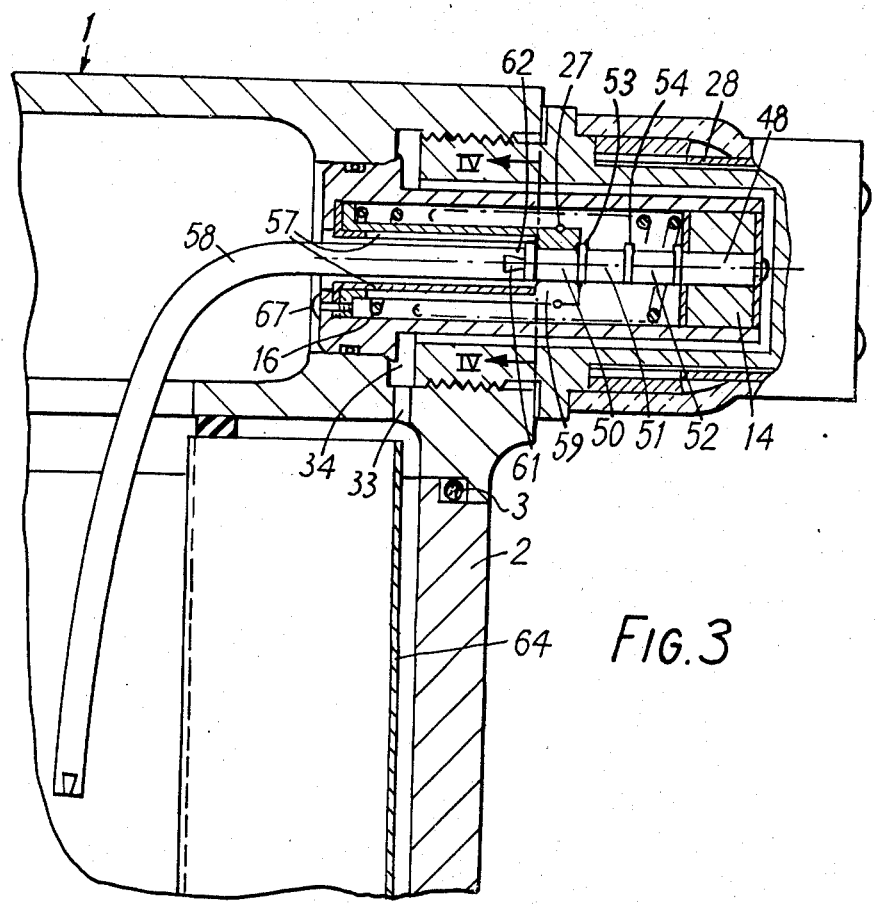
FIG. 3 shows a view of a further modification which may be applied to the embodiments of FIGS. 1 and 2 to render the indicator non-self resetting, and, which view is taken along III—III in FIG. 4.
Figure 4:
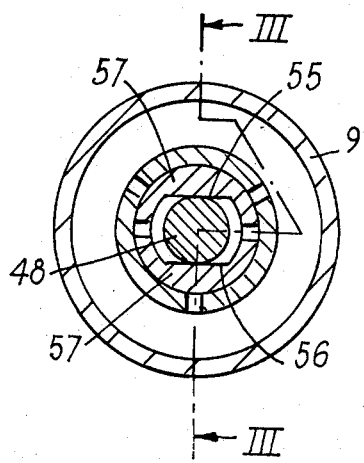
FIG. 4 is a cross section on the line IV—IV of FIG. 3.

If, however, it is desired that the piston can only move towards its original position as the result of a manual resetting operating, the arrangement shown in FIGS. 3 and 4 may be used. Here, the three portions 50, 51 and 52 of the rod 48 are of the same diameter as each other and are separated by radial ribs 53 and 54 which offer the same resistance to passage through the collet jaws as to the steps between the portions 20, 21 and 22 in the embodiments of FIGS. 1 and 2. Each rib 53, 54 in fact comprises a pair of arcuate rib portions which are separated by a pair of opposed flats 55 and 56, the flats having the same diameter as the portions 50, 51, 52. Inner collet jaw 57 define a surface corresponding to the surface of the portion 50 with its two opposed flat portions.

In operation, with increasing contamination of the filter element, the piston 14 moves in steps each time a predetermined pressure is reached. Thus, when the first predetermined pressure is reached, the rib 53 is forced through the outer collet jaws 59 which then close again behind the rib 53 onto the portion 51 thereby preventing the spring 16 from returning the piston to the right as seen in FIG. 3 even when the installation is shutdown and the differential pressure disappears.

To enable the piston 14 to return to its initial position, a flexible element 58 capable of transmitting torque and formed for example by a length of stiff plastics tubing or by a long helical spring, is attached to the free end of the rod 48 for example by means of mating dove-tail formations 61, 62. The free end of the flexible member 58 is located within the filter element 64 so that it is only accessible for resetting the indicator when the contaminated filter element 64 has been removed. When the flexible element 58 is twisted, it rotates the rod 48 and the piston 14 sufficiently about their common axis for whichever portion 51 or 52 is trapped within the collet jaws to cam them apart sufficiently to permit the passage of the ribs 54, 53 through them so that the indicator can return to the position shown in FIG. 3.

For security, the collet may be fixed in position against rotation by screws, one of which is shown at 67.

I claim:

1. A differential pressure indicator comprising: a piston sildable in a cylindrical sleeve the opposite ends of which are in communication with fluid spaces between which a differential pressure may exist, resilient biasing means urging the piston towards the end of the sleeve associated with the higher pressure, a resiliently yieldable stop means for yieldably impeding movement of the piston in the direction against the resilient bias, an indicator member slidable on a surface exteriorly of the cylindrical sleeve and having a magnetic interconnection with the piston, a casing having a transparent portion and an opaque portion which conceals at least part of the indicator member in at least part of its range of movement, the arrangement being such that in use, with increasing differential pressure across the differential pressure indicator, the yieldable stop means holds the piston in a first position for as long as the differential pressure does not exceed a predetermined value but when the differential pressure exceeds this value the differential pressure across the piston will move the latter to a second position by causing the stop means to yield, the indicator member following the movement of the piston and co-operating with the casing so as to give a distinctive different visual indication in each of the positions of the piston.

2. An indicator according to claim 1, wherein the stop means defines a plurality of stops for yieldably impeding movement of the piston, said stops being spaced apart in a direction corresponding to longitudinal movement of the piston, said indicator member giving a distinctive indication for each position of the piston determined by said stops.

3. An indicator according to claim 1, wherein the transparent portion of the casing is formed as a lens whereby to display the same portion of the indicator element over a range of viewing angles.

4. An indicator according to claim 1, wherein the stop means is yieldable in the return direction under the action of the biasing means in the absence of a differential pressure, whereby to render the indicator self-resetting.

5. An indicator according to claim 4, wherein the stop means comprise a stepped rod connected to the piston and an axially fixed split collet embracing the stepped rod, the collet being resiliently biassed inwardly to offer yieldable resistance to expansion of the collet by movement of the stepped portion of said rod therethrough.

6. An indicator according to claim 1, wherein the stop means comprises a rod having a radial projection for each stop, and an axially fixed split collet embracing said rod, the collet being resiliently biassed inwardly to offer yieldable resistance to expansion of the collet by movement of the radial projection of said rod therethrough.

7. An indicator according to claim 6, wherein cooperating surfaces of the rod and collet are of non-circular section with sufficient variation of radius for angular movement of the rod about its axis to open the collet sufficiently to permit return movement of the rod projection therethrough.

8. An indicator according to claim 7, mounted in a filter for fluids to indicate differential pressure across a filter element in the filter, and an operating member for manually rotating the rod sufficiently to allow return movement of the rod and piston.

9. An indicator according to claim 8, wherein the operating member is only accessible when the filter element has been removed.

10. An indicator according to claim 1 mounted in a filter for a fluid, to indicate differential pressure across a filter medium in the filter.

* * * * *